A. WOLLENSAK.
RELEASE MECHANISM FOR PHOTOGRAPHIC SHUTTERS.
APPLICATION FILED AUG. 9, 1916.

1,235,273. Patented July 31, 1917.

Inventor:
Andrew Wollensak
by Davis & Simons
his attorneys

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION.

RELEASE MECHANISM FOR PHOTOGRAPHIC SHUTTERS.

1,235,273.     Specification of Letters Patent.     Patented July 31, 1917.

Original application filed March 9, 1916, Serial No. 83,180. Divided and this application filed August 9, 1916. Serial No. 113,911.

*To all whom it may concern:*

Be it known that I, ANDREW WOLLENSAK, a citizen of the United States, and resident of Rochester, in the county of Monroe and State of New York, have invented certain new and useful Improvements in Release Mechanisms for Photographic Shutters, of which the following is a specification.

This invention relates to release mechanisms for photographic shutters, and this application is a division of an application filed by me on March 9, 1916, Serial No. 83,180 on a photographic shutter. An object of the present invention is to provide a guide for the end of a release wire such as is commonly used in photographic shutters, and to so construct the guide that it shall be simple, cheap and effective.

To these and other ends, the invention consists in certain parts and combinations of parts all of which will be hereinafter described, the novel features being pointed out in the appended claims.

Figure 1:
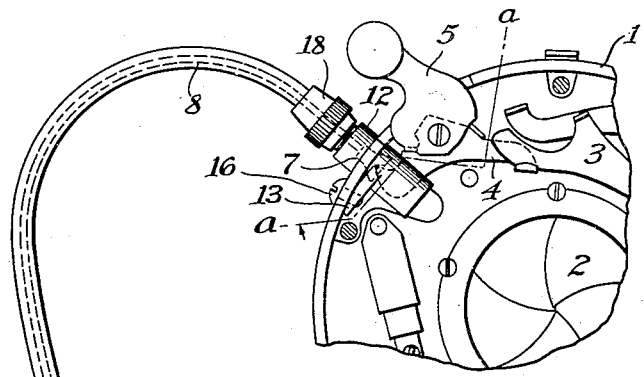
Figure 1 is a partial front view of a release mechanism embodying the present invention.
Figure 3:
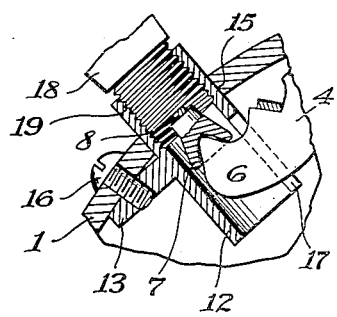
Fig. 3 is an enlarged portion of Fig. 1, in section.
Figure 2:
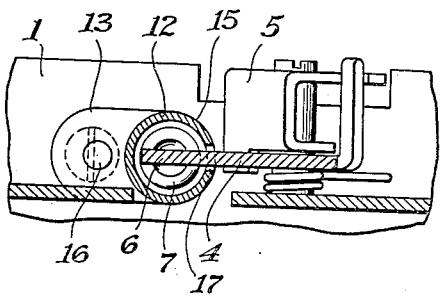
Fig. 2 is a section on the line *a—a*, of Fig. 1.
Figure 4:
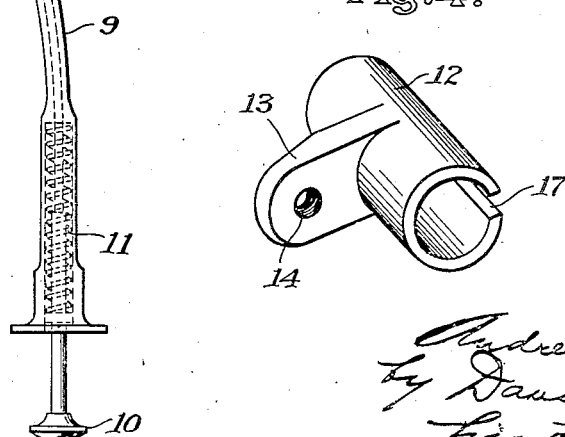
Fig. 4 is a perspective view of the guide tube.

The release mechanism may be applied to various types of shutters, although, in the present case, the shutter is illustrated as similar to that shown in the above mentioned application.

The shutter is represented as having a shell, blades 2, and a master member 3 that is adapted to operate said blades through suitable mechanism, not shown. The master member is set up or moved to operating position by an actuating lever 4, which, in turn, may be moved by a thumb piece 5. The actuating lever 4 has an extension 6 that is adapted to be engaged by the concave head 7 on a release wire or cable 8 of ordinary construction, this wire being sheathed in the usual flexible casing 9 and provided at its outer end with a finger button 10. A spring 11 returns the head 7 to the position shown when the button 10 is released.

To permit the wire 8 to be used for the purpose of moving the actuating lever 4 without becoming disengaged therefrom a guide for the head 7 is provided. In the present case, this guide comprises a cylindrical tube 12, having a laterally-extending lug or bracket 13 in which is a threaded hole 14. The tube 12 extends through and closely fits an opening 15 in the shell 1 of the shutter, while the lug 13 lies against the inner rim and is held in place by a stud 16. The actuating lever 4 extends through a slot 17 in the side of the tube opposite the lug 13, and the terminal 18 of the sheath 9 is threaded into the outer end of the tube 12 at 19.

By reason of the tube 12 extending through the opening 15, the single stud 16 is the only fastening required to hold the tube in place, so that the labor of assembling these parts is greatly minimized. The tube 12 is of sufficient length to guide the head 7 through the entire length of travel of the actuating lever 4, so that the head is always held in engagement with the end 6 of said lever and will not slip out of connection with the master lever. By this construction, the attaching tube for the release wire also serves as a guide for the end of the release wire to prevent disconnection between said release wire and the actuating lever for the shutter operating mechanism.

What I claim as my invention and desire to secure by Letters Patent is:

1. In combination in a photographic shutter having a casing, a release wire and an actuating lever for the shutter operating mechanism, an attaching tube for the release wire projecting through the outer wall of the shutter casing and extending into the casing, the extended portion within the casing having a recess therein through which the actuating lever operates so that the extended portion will serve as a guide for the release wire to prevent disconnection between the latter and the actuating lever.

2. In combination in a photographic shutter, an attaching tube, a release wire having a sheath engaging with the outer end of said tube and a head operating beyond the inner end of the sheath, said head being guided throughout its entire operating movements by said tube, and an actuating lever for the shutter operating mechanism, engaged by said head.

3. A release mechanism for photographic shutters comprising a release wire, a head on said wire, and a tubular guide for said head having a lateral lug adapted to be fastened to the shutter casing by a single stud.

4. In combination with a shutter casing having a perforation, a release mechanism comprising a tubular guide extending through the perforation in the shutter casing and having a lateral lug secured to said casing to one side of the perforation, and also having a slot to receive an actuating member of the shutter, and a release wire extending into said guide.

5. In combination with a shutter casing, a release mechanism comprising a tubular guide extending through the shutter casing, and projecting inside and outside thereof, said guide having a lateral lug on one side and a slot on the other side, and being secured to the shutter casing by said lug, and a release wire having a head adapted to move within the guide and to engage an actuating member of the shutter.

ANDREW WOLLENSAK.